(12) United States Patent
Choi

(10) Patent No.: US 11,185,168 B2
(45) Date of Patent: Nov. 30, 2021

(54) CONNECTORS FOR COLLAPSIBLE BED FRAME AND COLLAPSIBLE BED FRAME HAVING SAME

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 238 days.

(21) Appl. No.: 16/432,098

(22) Filed: Jun. 5, 2019

(65) Prior Publication Data

US 2019/0387891 A1 Dec. 26, 2019

(30) Foreign Application Priority Data

Jun. 21, 2018 (CN) .......................... 201820960798.8

(51) Int. Cl.
*A47C 19/12* (2006.01)
*A47C 19/02* (2006.01)
*F16B 12/56* (2006.01)

(52) U.S. Cl.
CPC .......... *A47C 19/126* (2013.01); *A47C 19/027* (2013.01); *F16B 12/56* (2013.01)

(58) Field of Classification Search
CPC ..... A47C 19/126; A47C 19/027; A47C 19/14; A47C 19/022; A47C 19/122; A47C 19/021; A47C 19/12; A47C 19/005; A47C 19/025; A47C 19/04; A47C 19/024; F16B 12/56; F16B 12/54; F16B 12/52; Y10T 403/32081; Y10T 403/47; Y10T 403/477; Y10T 403/478; Y10T 403/479
See application file for complete search history.

(56) References Cited

U.S. PATENT DOCUMENTS

| 273,332 | A | 3/1883 | Woodin |
|---|---|---|---|
| 277,541 | A | 5/1883 | Bowers |
| 372,913 | A | 11/1887 | Hopkins |
| 557,997 | A | 4/1896 | Nessel |
| 687,238 | A | 11/1901 | Johnson |
| 705,384 | A | 7/1902 | Cooper |
| 736,569 | A | 8/1903 | Webb |
| 746,211 | A | 12/1903 | Webb |
| 797,011 | A | 8/1905 | Mosier |
| 984,823 | A | 2/1911 | Linden |

(Continued)

FOREIGN PATENT DOCUMENTS

| DE | 102018130110 A1 | 5/2020 |
|---|---|---|
| EP | 2182151 A2 | 5/2010 |

*Primary Examiner* — Robert G Santos
*Assistant Examiner* — Alison N Labarge
(74) *Attorney, Agent, or Firm* — Morgan, Lewis & Bockius LLP

(57) ABSTRACT

Disclosed are connectors and collapsible bed frames. A collapsible bed frame includes first and second frame units disposed side by side. Each of the first and second frame units comprises a plurality of bar units with adjacent bar units rotatably connected with each other. A collapsible bed frame also includes an inner lateral bar unit disposed between the first and second frame units, and rotatably connected with the first and second frame units. During contraction and expansion, the first frame unit, the second frame unit and the inner lateral bar unit remain substantially on a first plane defined by a top surface of the collapsible bed frame when it is expanded.

18 Claims, 8 Drawing Sheets

(56) References Cited

U.S. PATENT DOCUMENTS

| | | | | |
|---|---|---|---|---|
| 1,072,550 | A | 9/1913 | Unknown | |
| 1,694,420 | A | 12/1928 | Joselowitz | |
| 1,760,955 | A * | 6/1930 | Moss | E04B 1/585 403/174 |
| 1,806,358 | A * | 5/1931 | Manly | A47C 19/126 5/117 |
| 1,833,692 | A | 11/1931 | Silvio | |
| 2,057,334 | A * | 10/1936 | Hannum | A47B 3/002 108/157.17 |
| 2,492,070 | A | 12/1949 | Stone et al. | |
| 2,584,491 | A * | 2/1952 | Nelson | B23K 11/0033 219/98 |
| 2,602,012 | A * | 7/1952 | Doty | F16B 12/52 108/62 |
| 2,680,252 | A | 6/1954 | Hatton | |
| 2,772,424 | A | 12/1956 | Roche | |
| 2,782,075 | A | 2/1957 | Roscoe | |
| 2,823,392 | A * | 2/1958 | Barry | F16B 12/52 5/310 |
| 2,905,513 | A | 9/1959 | Kane | |
| 2,962,085 | A | 11/1960 | Frank | |
| 2,983,931 | A | 5/1961 | Nelson | |
| 3,185,499 | A * | 5/1965 | Reese | B60D 1/345 280/406.2 |
| 3,245,363 | A | 4/1966 | Kanitz | |
| 3,296,983 | A | 1/1967 | Brush | |
| 3,504,877 | A | 4/1970 | Lyon, Sr. | |
| 3,605,142 | A | 9/1971 | Weinhart | |
| 3,613,132 | A | 10/1971 | Weinhart | |
| 3,657,748 | A | 4/1972 | Weinhart | |
| 3,984,884 | A | 10/1976 | Spitz | |
| 4,391,008 | A | 7/1983 | Yamaoka | |
| 4,431,164 | A | 2/1984 | Jungo et al. | |
| 4,745,644 | A | 5/1988 | Pottschmidt | |
| 4,788,727 | A | 12/1988 | Liu | |
| 4,974,526 | A | 12/1990 | Wiygul, Jr. | |
| 5,469,589 | A | 11/1995 | Steed | |
| 5,562,050 | A | 10/1996 | Colquhoun | |
| 5,884,566 | A | 3/1999 | Chen | |
| 5,943,968 | A | 8/1999 | Dobson | |
| 6,449,786 | B1 | 9/2002 | Voit | |
| 6,485,219 | B1 | 11/2002 | Beyer | |
| 7,003,822 | B1 | 2/2006 | Sheehy | |
| 7,376,986 | B2 | 5/2008 | Smith | |
| 7,690,316 | B2 | 4/2010 | Yoo | |
| 7,739,760 | B2 | 6/2010 | Smith | |
| 7,784,122 | B2 | 8/2010 | Oh | |
| RE41,763 | E | 9/2010 | Ng | |
| 7,845,030 | B1 | 12/2010 | Pollard | |
| 8,006,328 | B2 | 8/2011 | Polevoy | |
| 8,006,329 | B2 | 8/2011 | Oh | |
| 8,042,205 | B2 | 10/2011 | Schulz, Jr. | |
| 8,176,581 | B2 | 5/2012 | Schulz, Jr. | |
| 8,678,490 | B2 | 3/2014 | Chen | |
| 8,822,885 | B2 | 9/2014 | Daneshvar | |
| 8,832,876 | B1 | 9/2014 | Oh | |
| 8,935,819 | B1 | 1/2015 | Hartley | |
| 8,978,176 | B1 | 3/2015 | Oh | |
| 8,990,979 | B1 | 3/2015 | Craver | |
| 9,021,964 | B2 | 5/2015 | Peng | |
| 9,332,833 | B2 | 5/2016 | Kim | |
| 9,596,943 | B2 | 3/2017 | Hartley | |
| 9,924,804 | B2 | 3/2018 | Hartley | |
| 10,321,767 | B2 | 6/2019 | Jin | |
| 10,687,630 | B1 | 6/2020 | Hartley | |
| 10,702,070 | B2 | 7/2020 | Oh | |
| 10,959,529 | B2 | 3/2021 | Choi | |
| 10,959,530 | B2 | 3/2021 | Choi | |
| 10,966,537 | B1 | 4/2021 | Denney | |
| 2006/0107456 | A1 * | 5/2006 | Joseph | A47C 17/58 5/2.1 |
| 2008/0109958 | A1 | 5/2008 | Wang | |
| 2009/0025143 | A1 * | 1/2009 | Oh | A47C 19/005 5/201 |
| 2010/0170190 | A1 | 7/2010 | Schulz, Jr. | |
| 2010/0171342 | A1 | 7/2010 | Chen | |
| 2010/0235989 | A1 | 9/2010 | Jin | |
| 2010/0275372 | A1 | 11/2010 | Oh | |
| 2010/0299831 | A1 | 12/2010 | Lee | |
| 2011/0258777 | A1 | 10/2011 | Schulz, Jr. | |
| 2012/0204770 | A1 | 8/2012 | Grace | |
| 2012/0304380 | A1 * | 12/2012 | Jin | A47C 19/126 5/400 |
| 2013/0000038 | A1 | 1/2013 | Schulz, Jr. | |
| 2013/0025051 | A1 | 1/2013 | Syrowitz | |
| 2014/0208506 | A1 | 7/2014 | Bartelsmeyer | |
| 2016/0143446 | A1 | 5/2016 | Hartley | |
| 2016/0255963 | A1 | 9/2016 | Jones | |
| 2016/0296004 | A1 | 10/2016 | Peng | |
| 2018/0042391 | A1 | 2/2018 | Oh | |
| 2018/0055235 | A1 | 3/2018 | Choi | |
| 2018/0116412 | A1 | 5/2018 | Jin | |
| 2018/0140103 | A1 | 5/2018 | Thompson | |
| 2019/0387888 | A1 | 12/2019 | Choi | |
| 2019/0387889 | A1 | 12/2019 | Choi | |
| 2019/0387890 | A1 | 12/2019 | Choi | |
| 2019/0387891 | A1 | 12/2019 | Choi | |
| 2019/0387892 | A1 | 12/2019 | Choi | |
| 2019/0387893 | A1 | 12/2019 | Choi | |
| 2020/0022501 | A1 | 1/2020 | Choi | |
| 2020/0022502 | A1 | 1/2020 | Choi | |
| 2020/0022503 | A1 | 1/2020 | Choi | |
| 2020/0146438 | A1 | 5/2020 | Choi | |
| 2020/0378426 | A1 | 12/2020 | Choi | |

* cited by examiner

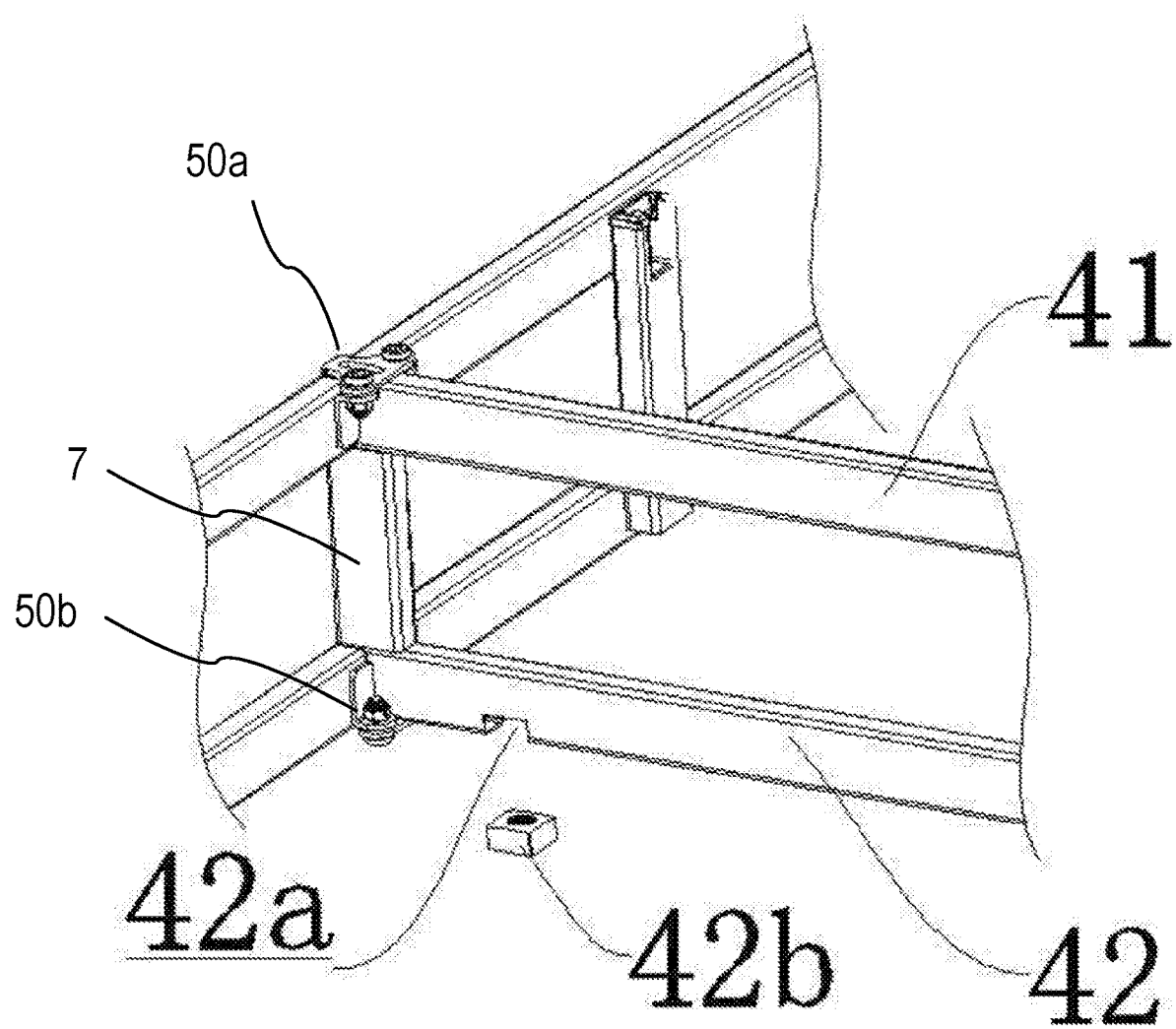

CONNECTORS FOR COLLAPSIBLE BED FRAME AND COLLAPSIBLE BED FRAME HAVING SAME

CROSS-REFERENCE TO RELATED APPLICATIONS

The present application claims priority to Chinese Utility Model Application CN 201820960798.8 filed Jun. 21, 2018. The disclosure of the application is incorporated herein for all purposes by reference in its entirety.

FIELD OF THE INVENTION

The present invention generally relates to bed frames and beds, and more particularly, to connectors, collapsible bed frames and beds having collapsible bed frames.

BACKGROUND

Many existing foldable bed frames are not user-friendly. For instance, existing bed frames are usually shipped with most of the components disassembled to save space and reduce cost. To use such a bed frame, one needs to assemble it first. This often involves connecting a number of lateral and longitudinal bars by screws, bolts or other connectors. Conversely, to fold such a bed frame, one needs to remove those connectors and disassemble the lateral and longitudinal bars. Assembling and disassembling the bed frame not only takes time and energy, but also requires tools such as screwdrivers and wrenches available every time when assembling or disassembling is desired. Moreover, disassembled parts, in particular those screws, bolts or other connectors, have to be stored carefully so that they would not get lost. Otherwise, the bed frame may not be assembled properly for next use.

Given the current state of the art, there remains a need for collapsible beds and bed frames that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present invention provides connectors, collapsible bed frames and beds having such collapsible bed frames.

In various exemplary embodiments, the present invention provides a collapsible bed frame including a collapsible bed frame including a first frame unit and a second frame unit disposed side by side. Each of the first frame unit, the second frame unit and the inner lateral bar unit has a first end and a second end. The collapsible bed frame also includes an inner lateral bar unit disposed between the first and second frame units, and two first connectors to connect the first frame unit, the second frame unit and the inner lateral bar unit. Each of the two first connectors includes first, second and third pieces. The first piece includes an affixing piece, a first extension at a first side of the affixing piece and a second extension at a second side of the affixing piece, wherein the affixing piece is fixedly connected with the first or second end of the inner lateral bar unit. The second piece rotatably connected with the first extension of the first piece, and fixedly connected with the first or second end of the first frame unit. The third piece rotatably connected with the second extension of the first piece, and fixedly connected with the first or second end of the second frame unit. Each of the first and second frame units is able to contract and expand while remaining on a first plane defined by a top surface of the collapsible bed frame when it is expanded. Each of the first and second frame units has a middle pivoting portion, such that when in an intermediate state between contracted and expanded states, left sides of the first and second frame units collectively form a substantially "W" shape, and right sides of the first and second frame units collectively form another substantially "W" shape.

In some exemplary embodiments, each of the first and second extensions is formed with a through-hole, and each of the second and third pieces is formed with a corresponding through-hole and rotatably connected with the first or second extension by a fastener via the through-holes.

In some exemplary embodiments, each of the two first connectors further includes a limiting piece disposed at an exterior side of the affixing piece with respect to the first or second end of the inner lateral bar unit, wherein the limiting piece prevents the first and second frame units from rotating beyond the expanded state when the bed frame is expanded.

In some exemplary embodiments, the affixing piece is formed with a through hole.

In an exemplary embodiment, each of the two first connectors further includes a fourth piece disposed at an opposite side of the inner lateral bar unit with respect to the first piece.

In some exemplary embodiments, the inner lateral bar unit includes a vertical supporting bar disposed adjacent the first piece of each first connector.

In some exemplary embodiments, each of the first and second frame units includes an upper frame and a lower frame, and the inner lateral bar unit includes an upper lateral bar and a lower lateral bar. A plurality of vertical supporting bars is disposed between the upper and lower frames of the first and second frame units and between the upper and lower bars of the inner lateral bar unis.

In some exemplary embodiments, each of the first frame unit, the second frame unit and the inner lateral bar unit is formed with one or more openings at a lower side thereof, wherein each opening receives a nut, and the nut is fixedly coupled with the first frame unit, the second frame unit or the inner lateral bar unit.

In an exemplary embodiment, the nut is leveled with the first frame unit, the second frame unit or the inner lateral bar unit.

In various exemplary embodiments, the present invention provides a collapsible bed frame including a first frame unit and a second frame unit disposed side by side, and an inner lateral bar unit disposed between the first and second frame units. Each of the first and second frame units includes a plurality of bar units, wherein adjacent bar units are rotatably connected with each other. Each of the first frame unit, the second frame unit and the inner lateral bar unit has a first end and a second end. The first ends of the first and second frame units are rotatably connected with the first end of the inner lateral bar unit. The second ends of the first and second frame units are rotatably connected with the second end of the inner lateral bar unit. During contraction and expansion, the first frame unit, the second frame unit and the inner lateral bar unit remain substantially on a first plane defined by a top surface of the collapsible bed frame when it is expanded.

In some exemplary embodiments, the first or second frame unit includes a first longitudinal bar unit at a first side of the bed frame, and a second longitudinal bar unit at a second side of the bed frame. Each of the first and second longitudinal bar units includes a first longitudinal segment unit and a second longitudinal segment unit rotatably connected with each other at one ends thereof. The one ends of the first and second longitudinal segment units of the first longitudinal bar unit and the one ends of the first and second longitudinal segment units of the second longitudinal bar unit move toward each other during contraction, and move away from each other during expansion.

In some exemplary embodiments, each of the first and second frame units includes the first longitudinal bar unit at the first side of the bed frame, and the second longitudinal bar unit at the second side of the bed frame. When in an intermediate state between contracted and expanded states, the first longitudinal bar units of the first and second frame units collectively form a substantially "W" shape, and the second longitudinal bar units of the first and second frame units collectively form another substantially "W" shape.

In various exemplary embodiments, a collapsible bed frame of the present invention further includes two first connectors. Each first connector includes first, second and third pieces. The first piece includes an affixing piece, a first extension at a first side of the affixing piece and a second extension at a second side of the affixing piece, wherein the affixing piece is fixedly connected with the first or second end of the inner lateral bar unit. The second piece is rotatably connected with the first extension of the first piece, and fixedly connected with the first or second end of the first frame unit. The third piece is rotatably connected with the second extension of the first piece, and fixedly connected with the first or second end of the second frame unit.

In some exemplary embodiments, each of the first and second extensions is formed with a through-hole, and each of the second and third pieces is formed with a corresponding through-hole and rotatably connected with the first or second extension by a fastener via the through-holes.

In some exemplary embodiments, the first ends or the second ends of the first and second frame units are disposed in an exterior side of the bed frame with respect to the second and third piece of the first connector.

In some exemplary embodiments, each of the two first connectors further includes a limiting piece disposed at an exterior side of the affixing piece with respect to the first or second end of the inner lateral bar unit, and forming collectively with the affixing piece a substantially "L"-shaped structure, wherein the limiting piece prevents the first and second frame units from rotating beyond the expanded state when the bed frame is expanded.

In some exemplary embodiments, the affixing piece is formed with a through hole.

In some exemplary embodiments, the inner lateral bar unit includes an upper lateral bar and a lower lateral bar. A vertical supporting bar is disposed between the upper and lower bars of the inner lateral bar unit adjacent each of the first and second ends of the lateral bar unit.

In some exemplary embodiments, each of the first frame unit, the second frame unit and the inner lateral bar unit is formed with one or more openings at a lower side thereof, wherein each opening receives a nut, and the nut is fixedly coupled with the first frame unit, the second frame unit or the inner lateral bar unit.

In an exemplary embodiment, the nut is leveled with the first frame unit, the second frame unit or the inner lateral bar unit.

The connectors, bed frames and beds of the present invention have other features and advantages that will be apparent from, or are set forth in more detail in, the accompanying drawings, which are incorporated herein, and the following Detailed Description, which together serve to explain certain principles of exemplary embodiments of the present invention.

BRIEF DESCRIPTION OF THE DRAWINGS

The accompanying drawings, which are incorporated into and constitute a part of this specification, illustrate one or more exemplary embodiments of the present invention and, together with the Detailed Description, serve to explain the principles and implementations of exemplary embodiments of the invention.

FIG. 8 is an enlarged view taken along circle C of FIG. 7.

Figure 1:
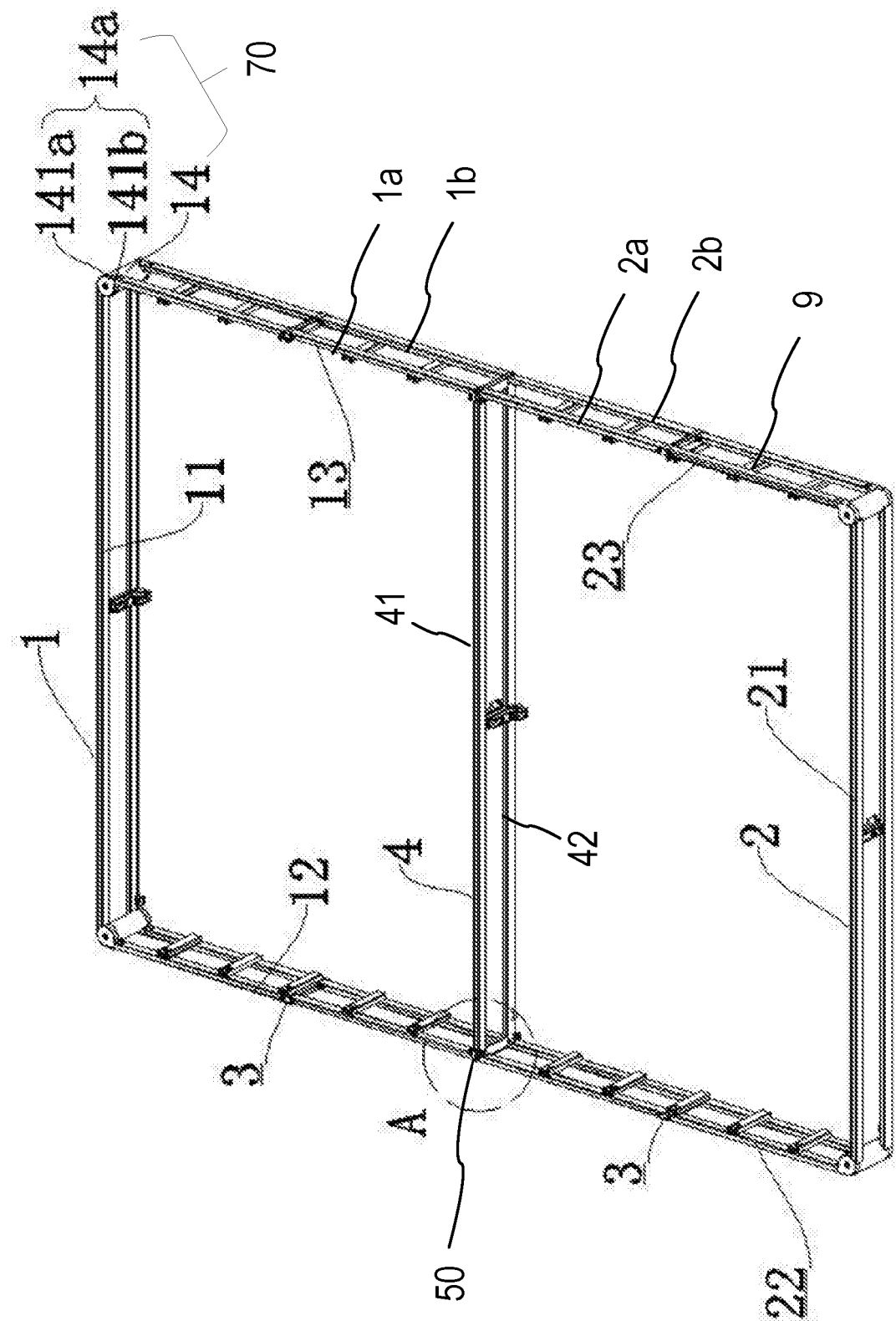
FIG. 1 is a perspective view illustrating an exemplary bed frame in an expanded state in accordance with exemplary embodiments of the present invention.

As will be apparent to those of skill in the art, the components illustrated in the figures described above are combinable in any useful number and combination. The figures are intended to be illustrative in nature and are not limiting.

DETAILED DESCRIPTION

Reference will now be made in detail to implementations of exemplary embodiments of the present invention as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present invention will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present invention are described in the context of collapsible bed frames and beds having one or more such collapsible bed frames. The collapsible beds and bed frames of the present invention can be of various sizes including but not limited to twin, full, queen and king sizes, and of various shapes including but not limited to rectangles and squares. They can be made of various materials including but not limited to metals (e.g., cast iron, steel, aluminum), plastics and woods.

In general, a collapsible bed frame of the present invention includes one or more frame units, each capable of contracting and expanding while remaining on a plane defined by a top surface of the collapsible bed frame when it is expanded. The plane defined by the top surface of the collapsible bed frame when it is expanded is referred herein as the first plane. In various exemplary embodiments, the first plane is substantially parallel to the top surface of the collapsible bed frame when it is expanded. In some exemplary embodiments, the first plane is considered as the space defined by the top surface and the bottom surface of the collapsible bed frame when it is expanded.

A collapsible bed frame of the present invention can include a single frame unit, disclosed herein, that can contract and expand within the first plane. In various exemplary embodiments, a collapsible bed frame of the present invention includes two, three, four, or more frame units, of which adjacent frame units are disposed side by side and connected with each other. Each of these two, three, four, or more frame units can contract and expand while remaining on the first plane and connected with the other frame units. It should be noted that the two, three, four, or more frame units can have substantially the same configuration or different configurations as long as each of them can contract and expand while remaining on the first plane and connected with the other frame units.

In some exemplary embodiments, a frame unit includes a plurality of bar units, where adjacent bar units are connected with each other and rotatable with respect to each other along one or more axes each substantially perpendicular to the first plane. For instance, two adjacent bar units can be connected with each other and rotatable with respect to each other along a single common axis substantially perpendicular to the first plane or along two different axes each substantially perpendicular to the first plane.

Figure 5:
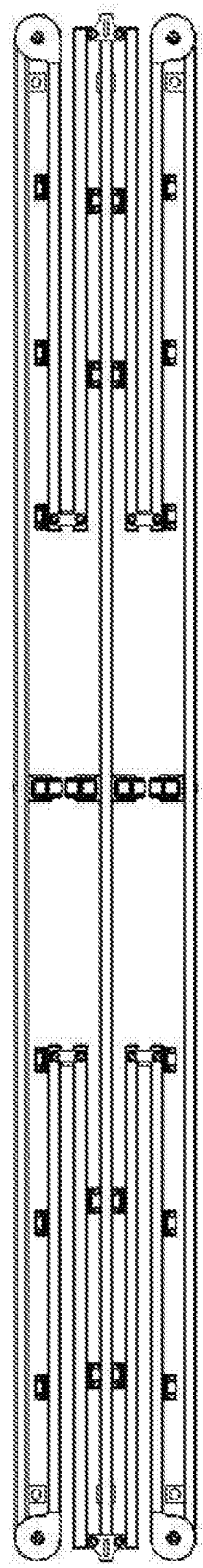
FIG. 5 is a top view illustrating an exemplary bed frame in a contracted state in accordance with exemplary embodiments of the present invention.

During contraction, at least a subset of bar units in the plurality of bar units retreats into an interior space defined by the collapsible bed frame when it is expanded. In various exemplary embodiments, the plurality of bar units of each frame unit moves toward the proximal sides of the frame units during contraction, and moves away from the proximal sides of the frame units during expansion. This allows multiple bar units contract onto each other, and thus facilitate multiple bending and contraction of the collapsible bed frame. In various exemplary embodiments, when in an intermediate state between contracted and expanded states, bar units on one side of the collapsible bed frame collectively form a substantial "W" or other zigzag shape, and bar units on the opposite side of the collapsible bed frame, collectively forming another substantial "W" or other zigzag shape. In other words, bar units on each of these two sides are bended multiple times while connected with each other. This significantly reduces the contracted size of the collapsible bed frame as illustrated in FIG. 5 without being disassembled. As such, it can be easily put to use with no need of cumbersome or complicated installation.

In various exemplary embodiments, a collapsible bed frame of the present invention also includes an inner lateral bar unit disposed between adjacent frame units and connected with the adjacent frame units.

Figure 3:
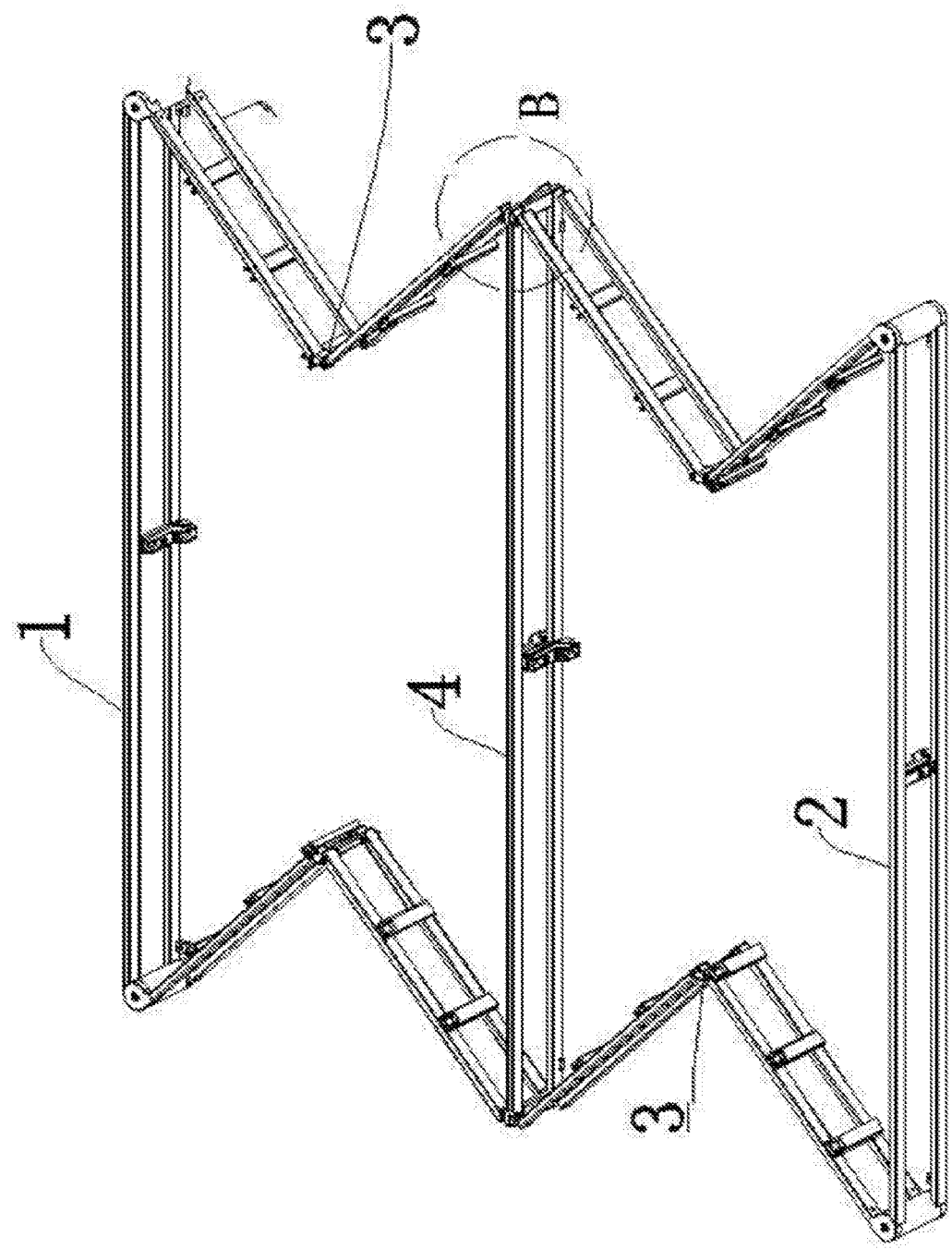
FIG. 3 is a perspective view illustrating an exemplary bed frame in an intermediate state in accordance with exemplary embodiments of the present invention.

By way of example, FIGS. 1, 3 and 5 illustrate an exemplary collapsible bed frame in an expanded state, an intermediate state and a contracted state, respectively. The top surface of the collapsible bed frame, when it is expanded, defines a plane, referred herein as the first plane. In some exemplary embodiments, the first plane is substantially parallel to the top surface of the bed frame when it is expanded. While remaining on the first plane, each of the first and second frame units can contract from the expanded state as illustrated in FIG. 1 to an intermediate state as illustrated in FIG. 3 and then to a contracted state as illustrated in FIG. 5. The contraction process is reversible. For instance, while remaining on the same first plane, each of the first and second frame units can expand from the contracted state as illustrated in FIG. 5, through the intermediate state as illustrated in FIG. 3, to the expanded state as illustrated in FIG. 1.

In various exemplary embodiments, the collapsible bed frame includes first frame unit 1 and second frame unit 2, disposed side by side and connected with each other at their proximal sides, i.e., the middle of the bed frame in FIG. 1. The sides opposite the proximal sides are referred to as their distal sides, which in some exemplary embodiments correspond to head and foot sides of the bed frame. The other two sides are referred to as left and right sides. It should be noted that the term "middle" as used herein does not necessarily mean the center of the bed frame, and the term "side" does not necessarily mean an outmost edge of the frame unit or an outmost edge of the bed frame.

It should be noted that first frame unit 1 and second frame unit 2 can be different, for instance, with one frame unit longer than the other in the longitudinal direction of the collapsible bed frame. By way of example, first frame unit 1 and second frame unit 2 in FIG. 1 are the same as or similar to each other, resulting in a substantially symmetric collapsible bed frame.

In some exemplary embodiments, first frame unit 1 includes first outer lateral bar unit 11, first longitudinal bar unit 12 and second longitudinal bar unit 13. First longitudinal bar unit 12 is disposed at a first side of the bed frame (e.g., left side in the figure) and second longitudinal bar unit 13 is disposed at a second side of the bed frame (e.g., right side in the figure). Similarly, second frame unit 2 includes second outer lateral bar unit 21, first longitudinal bar unit 22 and second longitudinal bar unit 23. First longitudinal bar unit 22 is disposed at the first side of the bed frame and second longitudinal bar unit 23 is disposed at the second side of the bed frame.

In many exemplary embodiments, a collapsible bed frame also includes inner lateral bar unit 4 disposed between first frame unit 1 and second frame unit 2. First longitudinal bar unit 12 has an end rotatably connected with a first end of first outer lateral bar unit 11, and the other end rotatably connected with a first end of inner lateral bar unit 4. Second longitudinal bar unit 13 has an end rotatably connected with a second end of first outer lateral bar unit 11, and the other end rotatably connected with a second end of inner lateral bar unit 4. First longitudinal bar unit 22 has an end rotatably connected with a first end of second outer lateral bar unit 21, and the other end rotatably connected with the first end of inner lateral bar unit 4. Second longitudinal bar unit 23 has an end rotatably connected with a second end of second outer lateral bar unit 21, and the other end rotatably connected with the second end of inner lateral bar unit 4.

In some exemplary embodiments, a longitudinal bar of a frame unit includes two or more longitudinal segment units, where adjacent segment units are connected with each other and rotatable with respect to each other along one or more axes each substantially perpendicular to the first plane. For instance, by way of example, FIGS. 1 and 3 illustrate each of longitudinal bar units 12, 13, 22 and 23 made of two longitudinal segment units rotatably connected with each other at their proximal ends. Two longitudinal segment units can be rotatably connected with each other by any suitable means, including but not limited to the connectors disclosed herein (e.g., first connector 50).

The rotatably connected proximal ends of two longitudinal segment units is referred to herein as a middle pivoting portion and indicated by reference numeral 3 in the figures. The middle pivoting portion of first longitudinal bar unit 12 and the middle pivoting portion of second longitudinal bar unit 13 move toward each other during contraction, and move away from each other during expansion. Similarly, the middle pivoting portion of first longitudinal bar unit 22 and the middle pivoting portion of second longitudinal bar unit 23 move toward each other during contraction, and move away from each other during expansion. When in an intermediate state as illustrated in FIG. 3, first longitudinal bar units 12, 22 collectively form a substantially "W" shape, and second longitudinal bar units collectively form another substantially "W" shape.

It should be noted that a frame unit can include a single frame, or a stack of frames that includes two, three or more frames arranged one over another. The two, three or more frames can be but not necessarily have to be in direct contact. Similarly, a bar unit can include a single bar or a stack of bars. In additional, a bar can be a whole bar or made of two, three or more segments connected (fixed or movable) with each other.

By way of example, FIG. 1 illustrates first frame unit 1 including upper frame 1a and lower frame 1b stacked one above another, and second frame 2 including upper frame 2a and lower frame 2b stacked one above another. FIG. 1 also illustrates inner lateral bar unit 4 having upper lateral bar 41 and lower lateral bar 42. In some embodiments, each of the first and second frames includes a plurality of vertical supporting bars such as vertical supporting bars 9. Vertical supporting bars 9 are disposed between the upper and lower frames. In some embodiments, vertical supporting bar 9 has an upper end connected with the upper frame and a lower end connected with the lower frame. Vertical supporting bars 9 support the upper frame.

In various exemplary embodiments, a collapsible bed frame of the present invention includes one or more connectors disposed between adjacent frame units and configured to connect the adjacent frame units. For instance, by way of example, FIG. 1 illustrates two first connectors 50 disposed between first frame unit 1 and second frame unit 2, and configured to connect first frame unit 1, second frame unit 2, and inner lateral bar unit 4. It should be noted that the two first connectors can be the same as or different from each other.

In some exemplary embodiments, first connector 50 includes first, second and third pieces. Each of the second and third pieces is rotatably connected with the first piece. The first piece is fixedly connected with the first or second end of an inner lateral bar unit. The second piece is fixedly connected with the first or second end of the first frame unit, and the third piece is fixedly connected with the first or second end of the second frame unit.

Figure 2:
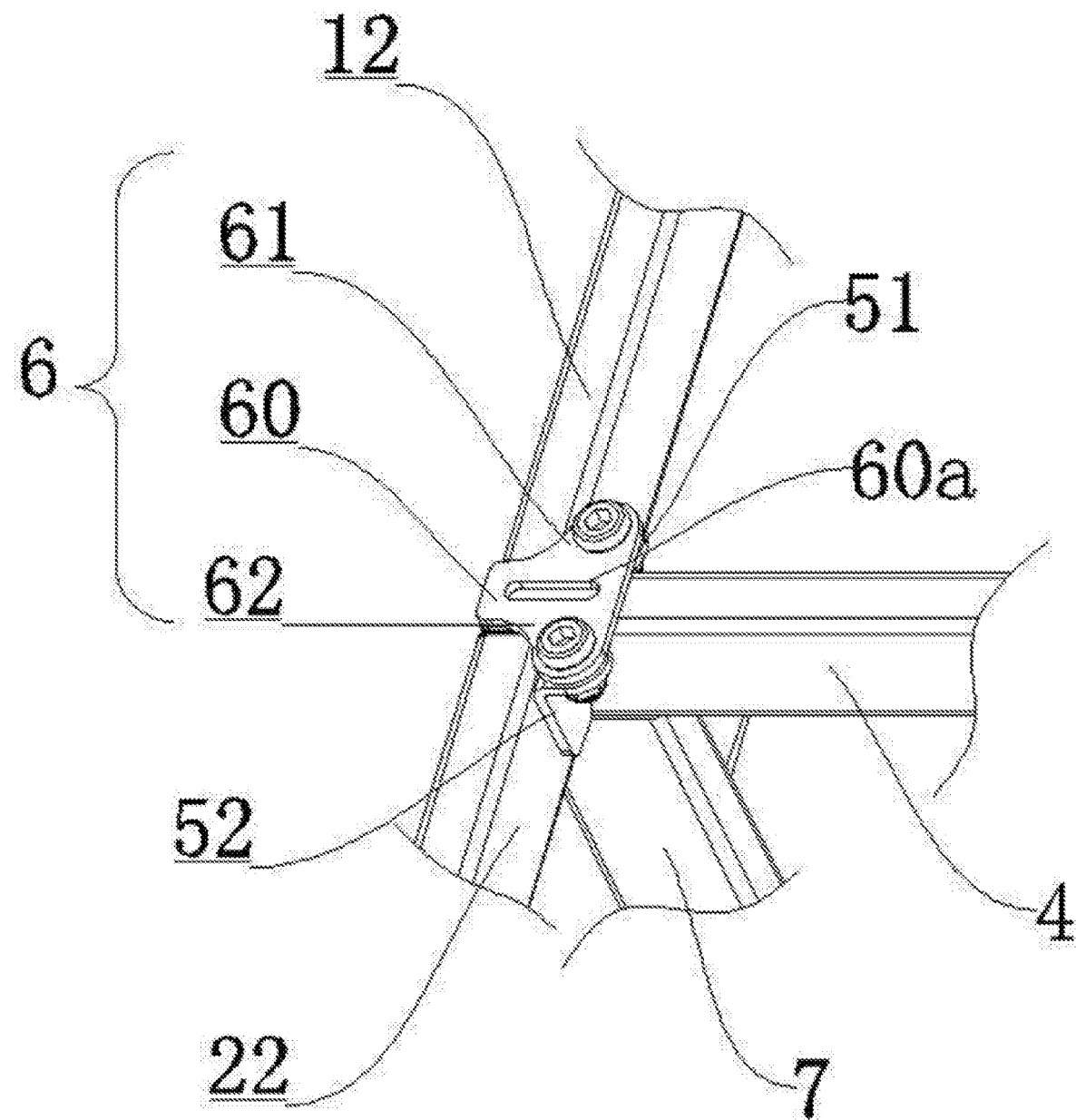
FIG. 2 is an enlarged view taken along circle A of FIG. 1.
Figure 4:
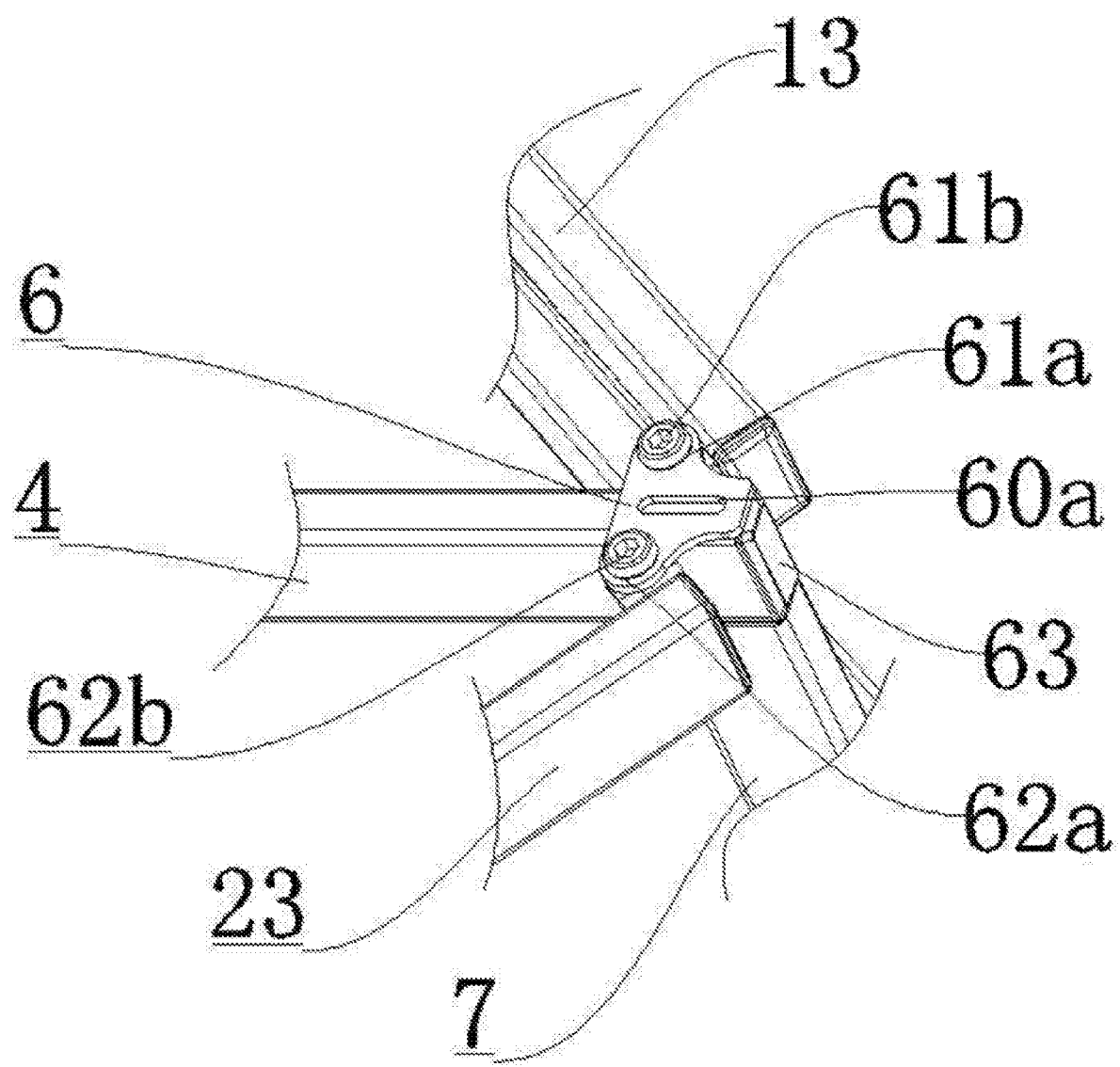
FIG. 4 is an enlarged view taken along circle B of FIG. 3.

For instance, by way of example, FIGS. 2 and 4 illustrates first connector 50 including first piece 6, second piece 51 and third piece 52. First piece 6 includes affixing piece 60, first extension 61 at a first side of the affixing piece and second extension 62 at a second side of the affixing piece. Second piece 51 is rotatably connected with first extension 61 of the first piece, and third piece 52 is rotatably connected with second extension 62 of the first piece. For instance, in some exemplary embodiments, first extension 61 is formed with hole 61a and second piece 51 is formed with a hole corresponding to hole 61a. Second piece 51 is connected with first extension 61 by fastener 61b (e.g., bolt, pin, latch or the like) through the holes. As such, second piece 51 is rotatable along fastener 61b with respect to first piece 6. Similarly, second extension 62 is formed with hole 62a and third piece 52 is formed with a hole corresponding to hole 62a. Third piece 52 is connected with second extension 62 by fastener 62b (e.g., bolt, pin, or the like) through the holes. As such, third piece 52 is rotatable along fastener 62b with respect to first piece 6.

The first or second end of inner lateral bar unit 4 is fixedly connected with affixing piece 60 of first piece 6, for instance, by welding or any other suitable means. For instance, in some exemplary embodiments, affixing piece 60 is formed with a slot, cut or the like such as slot 60a. Slot 60a exposes at least a portion of the end of inner lateral bar unit 4 to allow welding through the slot. Moreover, the slot allows multiple spot welding or continuous welding, and thus enhances the strength of the connection between the affixing piece and the inner lateral bar unit. Further, welding spot(s) is inside of the slot, thereby improving the aesthetic appearance.

The first end of the first frame unit (e.g., an end of first longitudinal bar unit 12 in FIG. 2) or the second end of the first frame unit (e.g., an end of second longitudinal bar unit 13 in FIG. 4) is fixedly connected with second piece 51, for instance, by welding or any other suitable means. Similarly, the first end of the second frame unit (e.g., an end of first longitudinal bar unit 22 in FIG. 2) or the second end of the second frame unit (e.g., an end of second longitudinal bar unit 23 in FIG. 4) is fixedly connected with third piece 52, for instance, by welding or any other suitable means.

As illustrated in FIGS. 2 and 4, in some exemplary embodiments, the first ends or the second ends of the first and second frame units (e.g., the ends of longitudinal bar units 12, 13, 22, 23) are disposed in an exterior side of the bed frame with respect to the second and third piece of the first connector. This allows the longitudinal bar units to rotate toward inner lateral bar unit 4 during contraction or away from inner lateral bar unit 4 during expansion while remaining on the first plane.

In some exemplary embodiments, first connector 50 includes a limiting piece to prevent the first and second frame units from rotating beyond the expanded state when the bed frame is expanded. For instance, by way of example, FIG. 4 illustrates limiting piece 63 disposed at an exterior side of affixing piece 60 with respect to the first or second end of the inner lateral bar unit. Limiting piece 63 and affixing piece 60 collectively form a substantially "L"-shape structure. When the bed frame is expanded, limiting piece 63 prevents the first and second frame units from rotating beyond the expanded state, e.g., keep longitudinal bar units 12, 22 or longitudinal bar units 13, 23 in a substantially straight line.

In some exemplary embodiments, first connector 50 includes a fourth piece disposed at an opposite side of the inner lateral bar unit with respect to first piece 6. That is, the ends of the longitudinal bar units are disposed between the first and fourth pieces. In an exemplary embodiment, the fourth piece is configured in accordance with the first piece or substantially the same as the first piece. For instance, the fourth piece can include an affixing piece, a first extension and a second extension similar to affixing piece 60, first extension 61 and second extension 62 of first piece 6. Limiting piece 63 is disposed between and connects the affixing pieces of the first and fourth pieces. Limiting piece 63 and the affixing pieces of the first and fourth pieces collectively form a substantially "U"-shaped structure. The first and fourth pieces guide the rotation of the longitudinal bar units and prevent deformation or distortion of the longitudinal bar units. As such, they enhance the stability of the bed frame and ensure the safe use of the bed frame.

Figure 7:
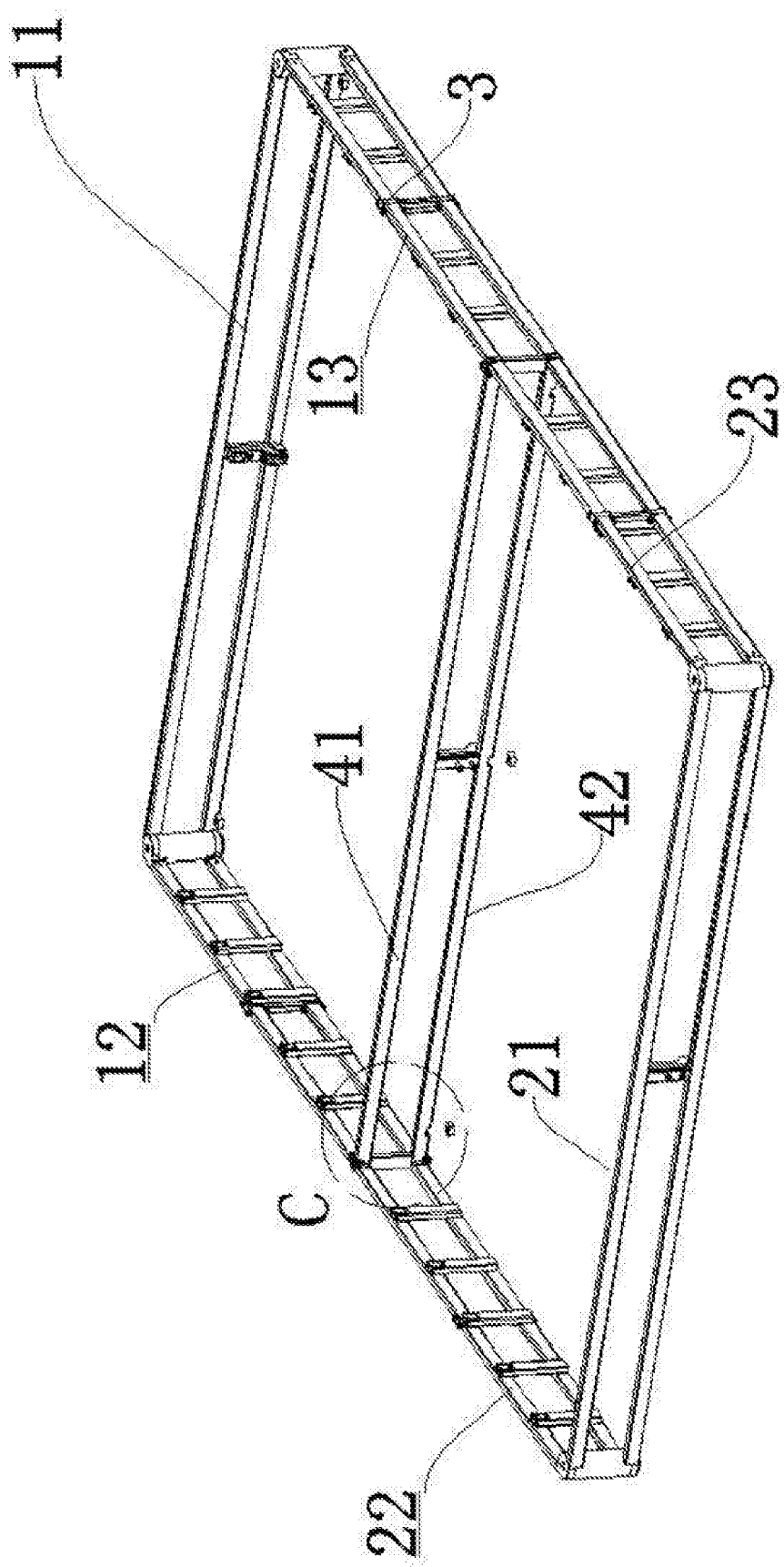
FIG. 7 is a perspective and partially disassembled view illustrating an exemplary bed frame in an expanded state in accordance with exemplary embodiments of the present invention.

It should be noted that first connector 50 can be a single connector or a stack of connectors. For instance, in some exemplary embodiments such as those where an inner lateral bar unit or adjacent longitudinal bar unit is a stack of bars, first connector 50 can be a stack of connectors (having two, three or more connectors) corresponding to the stack of bars. For instance, by way of example, FIGS. 1, 7 and 8 illustrate inner lateral bar unit 4 having upper lateral bar 41 and lower lateral bar 42. Accordingly, first connector 50 includes first upper connector 50a and first lower connector 50b. First upper connector 50a connects upper lateral bar 41 with upper longitudinal bars of longitudinal bar units 12, 22 or 13, 23, while first lower connector 50b connects lower lateral bar 42 with lower longitudinal bars of longitudinal bar units 12, 22 or 13, 23.

In some exemplary embodiments, a vertical supporting bar is disposed between the upper and lower bars of the inner lateral bar unit to enhance the strength and stability of the bed frame. For instance, by way of example, FIGS. 7 and 8 illustrate vertical supporting bar 7 disposed between the upper and lower bars and adjacent each of the first and second ends of the lateral bar unit. In an exemplary embodiment, vertical supporting bar 7 is in direct contact with upper bar 41 or lower bar 42. In an alternative exemplary embodiment, vertical supporting bar 7 is in direct contact with the fourth piece of first upper connector 50a or the fourth piece of first lower connector 50b.

In various exemplary embodiments, a collapsible bed frame of the present invention includes a plurality of second connectors configured to connect the outer lateral bar units with the first and second longitudinal bar units. It should be noted that any two of the second connectors can be the same as or different from each other. In some exemplary embodiments, each second connector is configured to connect one end (e.g., the first or second end) of an outer lateral bar unit (e.g., first outer lateral bar unit 11 or second outer lateral bar unit 21) with one end of an adjacent longitudinal bar unit. In some exemplary embodiments, a second connector includes a body and a coupler rotatable with respect to the body. The body is connected or fixedly connected with the end of the outer lateral bar unit. The coupler is connected or fixedly connected with the end of the adjacent longitudinal bar unit.

By way of example, FIG. 1 illustrates a bed frame including second connector 70 to connect the first or second end of an outer lateral bar unit (e.g., the outer lateral bar unit 11 or second outer lateral bar unit 21) with an end of an adjacent longitudinal bar unit (e.g., longitudinal bar unit 13). For instance, in some exemplary embodiments, second connector 70 includes body 14 configured to connect or fixedly connect with the end of the outer lateral bar unit. In an exemplary embodiment, body 14 has a substantially cylindrical shape.

Second connector 70 also includes coupler 14a disposed at body 14 and rotatable with respect to body 14. Coupler 14a is configured to connect or fixedly connect the end of the adjacent longitudinal bar unit. In some exemplary embodiments, coupler 14a includes linking part 141a and extension 141b extended from the linking part. Linking part 141a is disposed (e.g., fitted) at body 14, and rotatable along the axis of body 14. Extension 141b is hollow or formed with a recess to receive the end of the adjacent longitudinal bar unit. In an exemplary embodiment, extension 141b and the end of the adjacent longitudinal bar unit are further fastened together, for instance, by a fastener, welding, or any other suitable means.

Coupler 14a can be a single coupler or a stack of couplers. In some exemplary embodiments such as those where the adjacent longitudinal bar unit (e.g., longitudinal bar unit 13) is a stack of bars that includes two or more bars, coupler 14a itself can include two or more couplers, each for coupling with an end of one bar in the stack.

In various exemplary embodiments, receptacles are formed or disposed at some longitudinal or lateral bar units. Receptacles are configured to facilitate easy installation of lateral and/or longitudinal supporting bar units for supporting a mattress or the like, and to facilitate easy removal of the supporting bar units before contracting the bed frame.

Figure 6:
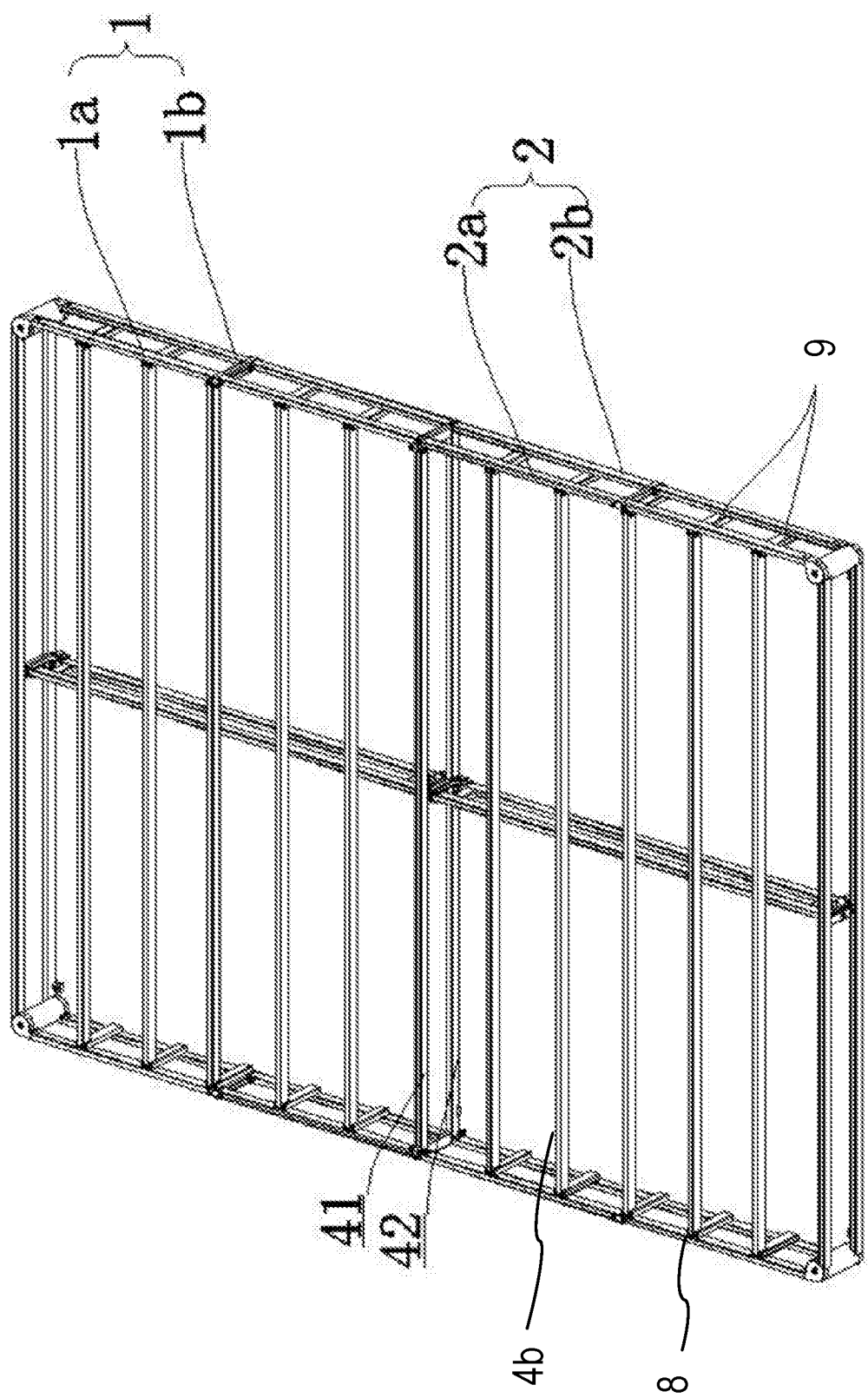
FIG. 6 is a perspective view illustrating an exemplary bed frame in an expanded state in accordance with exemplary embodiments of the present invention.

By way of example, FIG. 6 illustrates a plurality of receptacles 8 formed or disposed at upper frame 1a of frame unit 1 and upper frame 2a of frame unit 2. Receptacle 8 is configured to removably receive an end of lateral supporting bar 4b. With the lateral supporting bars, the bed frame is more comfortable and more stable.

In some exemplary embodiments, a collapsible bed frame of the present invention includes means to couple legs. For instance, by way of example, FIGS. 7 and 8 illustrate one or more openings 42a formed at the lower side of lower lateral bar 42. Opening 42a can have a square, a hexagonal or any other suitable shape. Nut 42b is placed in opening 42a and secured in the opening by welding or any other suitable means. In an exemplary embodiment, the nut is leveled with the inner lateral bar unit, e.g., the lower surface of the nut is on the same level as of the lower surface of lower lateral bar 42. Nut 42b can be used to install (e.g., screw) a leg.

In some exemplary embodiments, a plurality of openings is formed at the lower side e.g., the lower outer lateral bars and/or the lower longitudinal bars, of lower frame 1b and lower frame 2b. Nuts are placed and secured in some or all of these openings. In an exemplary embodiment, the openings formed at lower frame 1b and lower frame 2b are substantially the same as opening 42a. In an alternative exemplary embodiment, at least some openings formed at lower frame 1b and lower frame 2b are different from opening 42a, for instance, with different shapes or sizes for accommodating different nuts. In some exemplary embodiments, the nuts are leveled with lower frame 1b or lower frame 2b.

With nuts secured in the openings, legs can be easily installed by simply screwing on to the nuts. Moreover, a typical lateral or longitudinal bar is tubular. Drilling a screw hole in such a tubular bar often weakens the strength of the bar, and hence reduces the stability of the bed frame. With the openings and nuts disclosed herein, the collapsible bed frame of the present invention is stable and safe, and would not deform under normal circumstances.

As disclosed herein, the collapsible bed frames of the present invention can contract and expand while the lateral and longitudinal bar units are connected with each other. As such, there is no need to assemble or disassemble these parts, and there is no need to carry tools such as screwdrivers and wrenches. Moreover, the sizes of the collapsible bed frames when contracted are reduced significantly. As such, they require less space for shipping, transportation and storage. Further, with the receptacles, the lateral and longitudinal supporting bar units can be easily installed or removed. As such, using a collapsible bed frame of the present invention to make a comfortable bed is not time consuming and does not require much effort.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "lower" or "upper", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first longitudinal bar unit could be termed a second longitudinal bar unit, and, similarly, a second longitudinal bar unit could be termed a first frame, without changing the meaning of the description, so long as all occurrences of the "first longitudinal bar unit" are renamed consistently and all occurrences of the "second longitudinal bar unit" are renamed consistently.

What is claimed is:

1. A collapsible bed frame comprising:
   a first frame unit and a second frame unit disposed side by side;
   an inner lateral bar unit disposed between the first and second frame units; and
   two first connectors to connect the first frame unit, the second frame unit and the inner lateral bar unit such that each of the first and second frame units is able to contract and expand while remaining on a first plane defined by a top surface of the collapsible bed frame when it is expanded;
   wherein:
   each of the first frame unit, the second frame unit and the inner lateral bar unit has a first end and a second end;
   each of the two first connectors comprises:
      a first piece comprising an affixing piece, a first extension integrally extended from the affixing piece at a first side of the affixing piece and a second extension integrally extended from the affixing piece at a second side of the affixing piece, wherein the affixing piece is fixedly connected with the first or second end of the inner lateral bar unit, wherein the affixing piece, first extension and second extension are substantially planar and disposed substantially parallel to the first plane;
      a second piece comprising a first segment rotatably connected with the first extension of the first piece, and a second segment fixedly connected with the first or second end of the first frame unit, thereby allowing the first frame unit to contract and expand while remaining on the first plane; and
      a third piece comprising a third segment rotatably connected with the second extension of the first piece, and a fourth segment fixedly connected with the first or second end of the second frame unit, thereby allowing the second frame unit to contract and expand while remaining on the first plane.

2. The collapsible bed frame of claim 1, wherein each of the first and second extensions is formed with a through-hole, and each of the first segment of the second piece and the third segment of the third piece is formed with a corresponding through-hole and rotatably connected with the first or second extension by a fastener via the through-holes.

3. The collapsible bed frame of claim 1, wherein each of the two first connectors further comprises a limiting piece disposed at an exterior side of the affixing piece with respect to the first or second end of the inner lateral bar unit, wherein the limiting piece prevents the first and second frame units from rotating beyond the expanded state when the bed frame is expanded.

4. The collapsible bed frame of claim 1, wherein the inner lateral bar unit comprises a vertical supporting bar disposed adjacent the first piece of each first connector.

5. The collapsible bed frame of claim 1, wherein:
   each of the first and second frame units comprises an upper frame and a lower frame;
   the inner lateral bar unit comprises an upper lateral bar and a lower lateral bar; and
   a plurality of vertical supporting bars is disposed between the upper and lower frames of the first and second frame units and between the upper and lower bars of the inner lateral bar units.

6. The collapsible bed frame of claim 1, wherein:
   each of the first frame unit, the second frame unit and the inner lateral bar unit is formed with one or more openings at a lower side thereof, wherein each opening receives a nut, and the nut is fixedly coupled with the first frame unit, the second frame unit or the inner lateral bar unit.

7. The collapsible bed frame of claim 6, wherein the nut is leveled with the first frame unit, the second frame unit or the inner lateral bar unit.

8. The collapsible bed frame of claim 1, wherein each of the first and second frame units has a middle pivoting portion, such that when in an intermediate state between contracted and expanded states, left sides of the first and second frame units collectively form a substantially "W" shape, and right sides of the first and second frame units collectively form another substantially "W" shape.

9. The collapsible bed frame of claim 1, wherein the first and second segments of the second piece are substantially perpendicular to each other, and the third and fourth segments of the third piece are substantially perpendicular to each other.

10. A collapsible bed frame comprising:
    a first frame unit and a second frame unit disposed side by side;
    an inner lateral bar unit disposed between the first and second frame units; and
    two first connectors to connect the first frame unit, the second frame unit and the inner lateral bar unit;
    wherein each of the first frame unit, the second frame unit and the inner lateral bar unit has a first end and a second end;

wherein each first connector comprises:
a first piece comprising an affixing piece, a first extension at a first side of the affixing piece and a second extension at a second side of the affixing piece, wherein the affixing piece is formed with an elongated slot to expose at least a portion of the first or second end of the inner lateral bar unit, thereby allowing multiple spot welding or continuous welding through the elongated slot to enhance connection strength between the affixing piece and the inner lateral bar unit;
a second piece rotatably connected with the first extension of the first piece, and fixedly connected with the first or second end of the first frame unit;
and a third piece rotatably connected with the second extension of the first piece, and fixedly connected with the first or second end of the second frame unit, wherein the elongated slot is elongated in a longitudinal direction of the inner lateral bar unit.

11. The collapsible bed frame of claim 10, wherein:
each of the first and second frame units comprises a plurality of bar units, wherein adjacent bar units are rotatably connected with each other;
during contraction and expansion, the first frame unit, the second frame unit and the inner lateral bar unit remain substantially on a first plane defined by a top surface of the collapsible bed frame when it is expanded.

12. The collapsible bed frame of claim 11, wherein:
the first or second frame unit comprises a first longitudinal bar unit at a first side of the bed frame, and a second longitudinal bar unit at a second side of the bed frame;
each of the first and second longitudinal bar units comprises a first longitudinal segment unit and a second longitudinal segment unit rotatably connected with each other at one ends thereof; and
the one ends of the first and second longitudinal segment units of the first longitudinal bar unit and the one ends of the first and second longitudinal segment units of the second longitudinal bar unit move toward each other during contraction, and move away from each other during expansion.

13. The collapsible bed frame of claim 12, wherein:
each of the first and second frame units comprises the first longitudinal bar unit at the first side of the bed frame, and the second longitudinal bar unit at the second side of the bed frame; and
when in an intermediate state between contracted and expanded states, the first longitudinal bar units of the first and second frame units collectively form a substantially "W" shape, and the second longitudinal bar units of the first and second frame units collectively form another substantially "W" shape.

14. The collapsible bed frame of claim 10, wherein the first ends or the second ends of the first and second frame units are disposed in an exterior side of the bed frame with respect to the second and third piece of the first connector.

15. The collapsible bed frame of claim 10, wherein each of the two first connectors further comprises a limiting piece disposed at an exterior side of the affixing piece with respect to the first or second end of the inner lateral bar unit, and forming collectively with the affixing piece a substantially "L"-shaped structure, wherein the limiting piece prevents the first and second frame units from rotating beyond the expanded state when the bed frame is expanded.

16. The collapsible bed frame of claim 10, wherein:
the inner lateral bar unit comprises an upper lateral bar and a lower lateral bar; and
a vertical supporting bar is disposed between the upper and lower bars of the inner lateral bar unit adjacent each of the first and second ends of the lateral bar unit.

17. The collapsible bed frame of claim 10, wherein:
each of the first frame unit, the second frame unit and the inner lateral bar unit is formed with one or more openings at a lower side thereof, wherein each opening receives a nut, and the nut is fixedly coupled with the first frame unit, the second frame unit or the inner lateral bar unit.

18. The collapsible bed frame of claim 17, wherein the nut is leveled with the first frame unit, the second frame unit or the inner lateral bar unit.

* * * * *